United States Patent
Labatte et al.

(10) Patent No.: US 8,732,119 B2
(45) Date of Patent: May 20, 2014

(54) CONCURRENT ENGINEERING CONFLICT MANAGER

(75) Inventors: Brian D. Labatte, Montreal (CA); Adalberto Paul Taguchi, Cary, NC (US)

(73) Assignee: ABB Technology AG, Zurich (CH)

( * ) Notice: Subject to any disclaimer, the term of this patent is extended or adjusted under 35 U.S.C. 154(b) by 360 days.

(21) Appl. No.: 12/649,407

(22) Filed: Dec. 30, 2009

(65) Prior Publication Data

US 2010/0169272 A1    Jul. 1, 2010

Related U.S. Application Data

(60) Provisional application No. 61/141,701, filed on Dec. 31, 2008.

(51) Int. Cl.
*G06F 7/00* (2006.01)
*G06F 17/00* (2006.01)

(52) U.S. Cl.
USPC ............................ 707/608; 707/631; 707/638

(58) Field of Classification Search
USPC ......... 707/608, 613, 614, 626, 627, 631, 632, 707/638; 715/748
See application file for complete search history.

(56) References Cited

U.S. PATENT DOCUMENTS

| | | | | |
|---|---|---|---|---|
| 5,774,717 | A * | 6/1998 | Porcaro | 1/1 |
| 5,892,513 | A * | 4/1999 | Fay | 715/854 |
| 2005/0216639 | A1* | 9/2005 | Sparer et al. | 710/305 |
| 2005/0235012 | A1* | 10/2005 | Harry et al. | 707/203 |
| 2006/0136511 | A1* | 6/2006 | Ngo et al. | 707/203 |
| 2006/0136513 | A1* | 6/2006 | Ngo et al. | 707/203 |
| 2007/0016650 | A1* | 1/2007 | Gilbert et al. | 709/207 |
| 2009/0043774 | A1* | 2/2009 | Sudhakar | 707/9 |

FOREIGN PATENT DOCUMENTS

WO    WO 2007062949 A1 *    6/2007    ............. G06Q 10/00

* cited by examiner

*Primary Examiner* — James E Richardson
(74) *Attorney, Agent, or Firm* — Michael C. Prewitt; Melissa J. Szczepanik

(57) ABSTRACT

A conflict manager according to the present invention is provided for managing concurrent engineering. A common work area is provided and accessible by engineers who also maintain local work areas. The conflict manager immediately notifies users when a drawing file on the common work area is modified. The conflict manager further includes locking, versioning and conflict functionalities.

13 Claims, 20 Drawing Sheets

Fig. 5f

CONCURRENT ENGINEERING CONFLICT MANAGER

This application claims priority to U.S. Provisional Application No. 61/141,701 filed on Dec. 31, 2008 and titled Concurrent Engineering Conflict Manager, the contents of which are incorporated by reference in their entirety.

TECHNICAL FIELD

The present invention relates generally to methods and systems for managing CAD files in multi-user systems.

BACKGROUND

Modern product design is almost exclusively performed using computer aided drafting (CAD) software. Examples of CAD programs include Pro E, Solidworks and AutoCAD. These CAD systems enable users much greater precision and speed when designing components or assemblies. Further, because the CAD systems are computer based, multiple users may manipulate and/or modify drawings at any given time. These users can be in geographically remote locations.

Current collaborative design practices are generally based on serial collaboration, in which original digital product files are locked before work begins, passed back and forth among development team members who must wait to obtain these copies before they can make or offer design refinements. The prior art does not provide an announcement mechanism to immediately inform users when changes could impact their documentation, computer files, or drawings.

SUMMARY OF THE INVENTION

According to one aspect of the present invention, a method of managing collaborative design is provided. The method includes providing a common work area to store a current version of a drawing file therein. A first and a second local work area are provided, each in communication with the common work area and each storing a local version of the drawing file therein. A drawing file is uploaded from the first local work area to the common work area to replace the current version of the drawing file. A user of the second local work area is immediately notified of the replacement of the current version of the drawing file. A file status is indicated of the local version stored on the second local work area. The file status includes a first status if the local version stored on the second local work area was the same as the current version stored on the common work area just prior to replacing the current version, and a second file status if the local version stored on the second local work area was different from the current version stored on the common work area just prior to replacing the current version.

BRIEF DESCRIPTION OF THE DRAWINGS

FIG. 5F is a split-screen view of the conflict manager showing the notification functionality of the conflict manager.

DETAILED DESCRIPTION OF THE EMBODIMENT(S)

To address the requirements described below, one or more embodiments of the invention provide a method and system for facilitating the designing of "engineered-to-order" products using concurrent engineering practices. With the system according to the present invention, users are able to collaborate with members of an engineering or software design team. The system facilitates collaborative design by allowing concurrent work flows and providing notification when modifications are made.

The conflict manager according to the present invention functions symbiotically with preexisting CAD software such as, for example, ProE, Solidworks and AutoCAD. The conflict manager provides a communication tool, versioning functionality, and status messaging. The conflict manager is a software program that is installed locally on a designer/engineer's computer. For proper functionality, all members of a design team should have the conflict manager installed and operating on each client/local computer. Further, a common storage area must be accessible by each client computer. According to one embodiment, the common storage area is provided on a networked server. As will be hereinafter described in greater detail, CAD files are stored locally, on individual client/local computers as well as on the server in the common storage area.

The conflict manager according to the present invention functions essentially as an "engineering chaperone". Accordingly, it prevents and/or highlights conflicting engineering actions early in the "engineered-to-order" design process. In some sense, the conflict manager functions as a 'triage' tool wherein the first level of triage is accomplished by providing security to those files that don't need treatment, through a 'locking/isolating' mechanism. Under some circumstances, locking is not desirable. For example, locking while designing piping in large transformers, which affects many files, would lead to an increase of the throughput time. The second level of triage is accomplished by identifying which files have been modified to all. The third level of triage is accomplished by identifying where damage (i.e. conflicts) may occur and where a resolution is required. Finally, a fourth level of triage is provided by giving users the opportunity to correct damaging conflicts.

Figure 1:
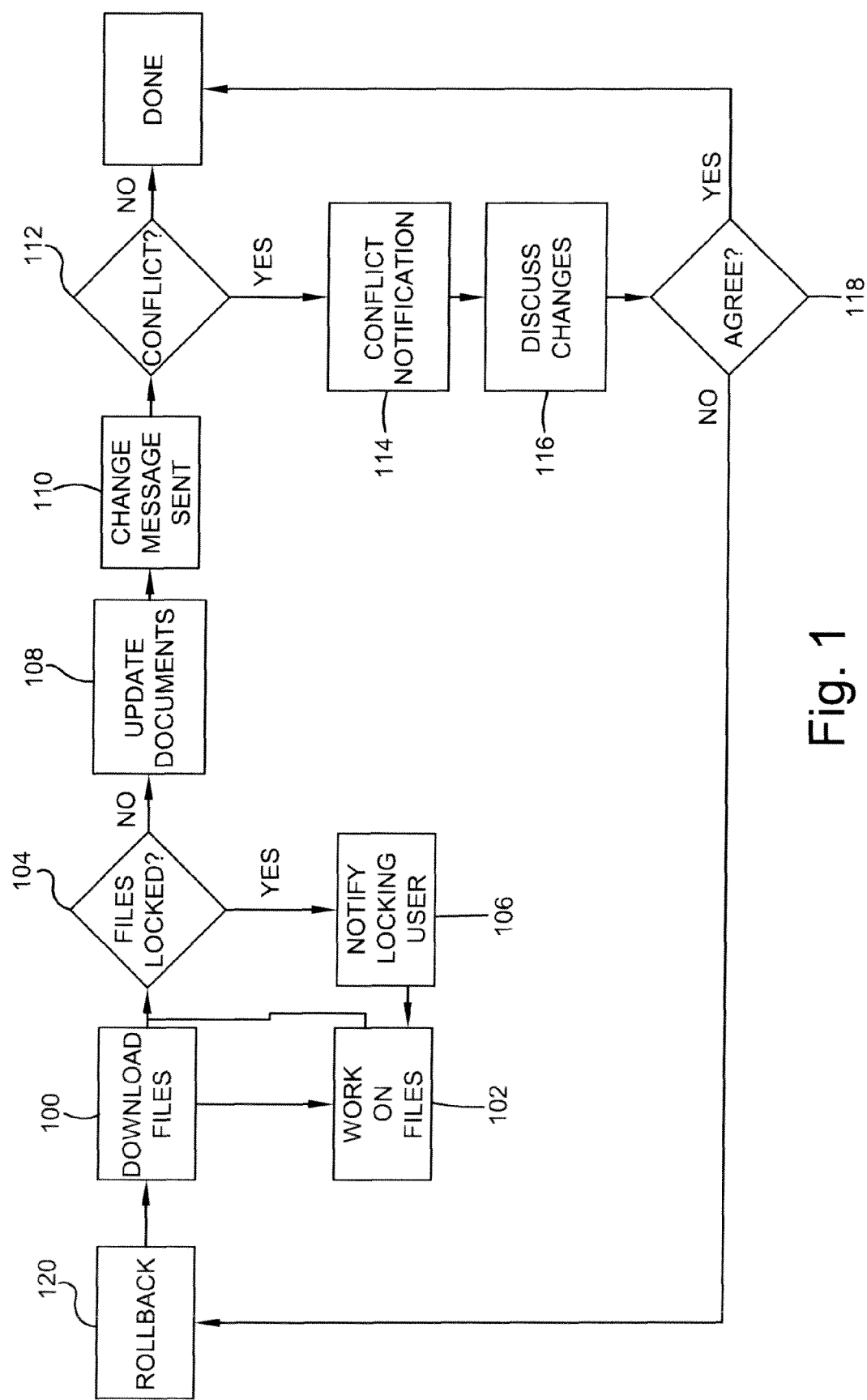
FIG. 1 is a process flow chart of the conflict manager according the present invention.

With reference now to FIG. 1, the general functionality of a conflict manager according to the present invention is shown. In a first step, through a graphical user interface, the conflict manager enables a user to download a file from the common work area. A common work area is maintained on a networked server and may be provided for a particular design team, for a specific factory, or a whole product group (spanning a plurality of factories and design groups). Thus, it should be appreciated that the number of users of the conflict manager may be as small as a few engineers in a small design group, to hundreds of individuals spanning multiple countries.

Hereinafter, the most recent, up-to-date version of a particular drawing file residing in the common storage area is referred to as the "current version." In addition to the current version, previous versions of a drawing file may also be retained in the common storage area. At 100, a user may download the current version to be stored in a users local work area, i.e. on a users client computer local hard drive. Once on the client computer local work area, at 102 the user may "open" the file from within the conflict manager user interface. This causes the file to be opened by the default local CAD software. Thereafter, the user may edit the CAD file and save any changes in the local work area.

A user may edit the CAD files and save changes in the local work area, however, those changes will not be made to the current version residing in the common work area until the user uploads/synchronizes the local file to the common storage area. When a file is uploaded to the common storage area, the uploaded file becomes the current version, and the replaced current version is stored as a previous version.

The conflict manager supports two approaches to uploading a CAD file. According to a first embodiment, uploading may only occur upon a local user's command. Thus, a user may modify local CAD files for an indefinite period of time, and those changes would remain in the local work area only, until the user chooses to upload. According to a second embodiment, the conflict manager may be set to automatically upload after a set period of time or at a given time in the day or week. Thus, for example, the conflict manager may be set to automatically attempt to upload at 5:00 pm every day or every Friday at midnight. According to other embodiments, the conflict manager may be configured to both accept manual upload requests and automatic/recurring upload requests.

At 104, when the conflict manager attempts to upload the local CAD file copy to replace the current version on the common work area, the conflict manager checks if the CAD file is "locked" by any other users. A current version may be locked by any user upon downloading the file from the common work area. If a current version is locked, no other user may upload their local CAD file copy and over-right the current version on the common work area. If a current version is locked, and a user (other than the locking user) attempts to upload their local version (thus overwriting the current version), at 106, a message indicates that the file is locked, thus allowing the user to continue working locally on the file, but preventing uploading. Further, a message may be sent to the locking user indicating that an attempt had been made to synchronize the current version. The message may be transmitted immediately to the locking user via a text message box. The message may further identify which user attempted to synchronize. According to one embodiment, the message may further provide contact information for the user to enable speedy off-line communication to resolve the situation.

If no lock has been placed on the current version on the common work area, the file is updated at 108, and the uploaded CAD file becomes the current version at 108. Concurrently, at 110 a "file change" notification message is sent to all users of the conflict manager. Though the file change message is sent to all users, certain users may choose to deactivate messages. In other embodiments, certain users are prevented from deactivating the message function. The file change message may include an identification of the CAD file that has been modified. The file change message may also include the identity of the user that uploaded the new file version. The file change message is presented to all users in the form of a text message box. According to one embodiment, the message may further provide contact information for the user to enable speedy off-line communication. A user receiving the file change message may simply choose to close and ignore the message box or may choose to contact the synchronizing user to discuss the changes.

As will be discussed in greater detail below, in addition to a file change pop-up message, the indicated status of a CAD file may also change on the various client machines if another user modifies and uploads a file.

When the current version is overwritten, at 112 the conflict manager checks if the same CAD file has been modified and saved in any other user's local work area. If so, then the conflict manager recognizes a conflict and, instead of, or in addition to the standard file change message, at 114 conflict message is sent to the user with a modified local version. As with the messages discussed above, the conflict message is presented to the user in the form of a text announcement message box and identifies (1) a conflict exists (2) with which CAD file there is a conflict and (3) the party that modified and uploaded the drawing file causing the conflict. According to one embodiment, the message may further provide contact information for the user. Thereafter, at 116 the uploading user and the one or more users having local copies in conflict with the uploading user may discuss the drawing changes. The discussion may be performed off-line via the telephone or face-to-face. In other embodiments, the discussion may be performed via email or instant messaging. At 118, if the conflicting parties agree that the changes are acceptable, the uploaded file remains the current version on the common work area. If the conflicting parties do not agree with the new changes, the file may be rolled back at 120 to a previous version.

If the conflict manager recognizes no conflicts, the system may optionally provide a final authorization check feature. In this case, for a given product, module, part or assembly, a user may be designated as a final decision maker. The final decision maker can 'lock' a folder thus finalizing the module and furthermore, denying or blocking any further changes. Thus, all uploads for a subject drawing must be approved by the final decision maker. If the final decision maker does not approve of the modified drawing, the drawing changes may be discussed between the user who uploaded the modified drawing and the final decision maker. If the final decision maker is ultimately persuaded, then the required folder is unlocked, the drawing changes are approved, and the uploaded version becomes the current version. If the final decision maker is not persuaded, no changes will be made.

Figure 2:
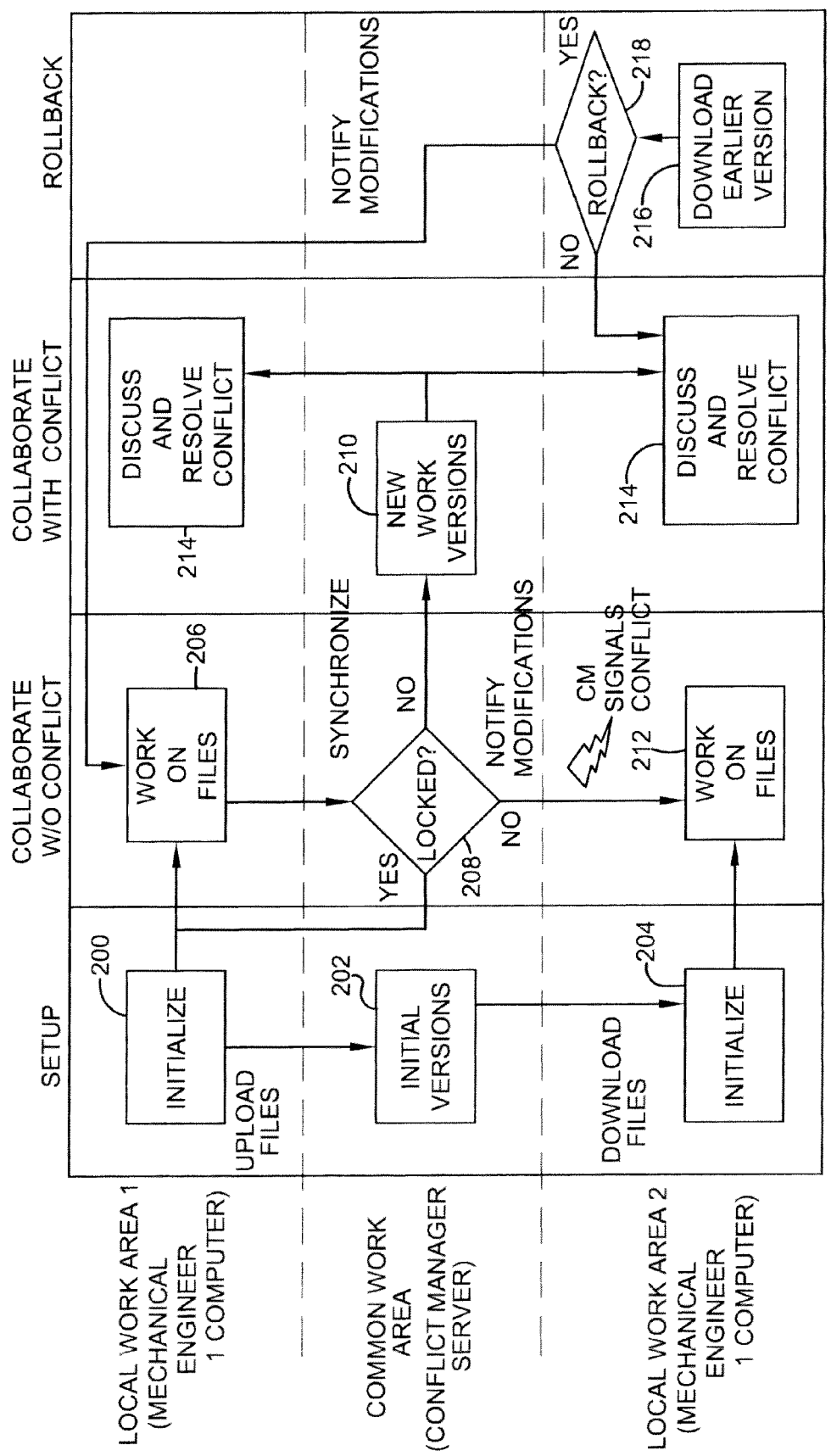
FIG. 2 is an exemplary scenario of two engineers using the conflict manager.

With reference now to FIG. 2, an exemplary conflict scenario is managed by the conflict manager. As can be seen, at 200 engineer one initializes the application on local work area one (on a first client machine). At 202 engineer one uploads a local version of a CAD file to the common work area. By doing so, any previous versions of the drawing file are replaced and the uploaded file becomes the current version. At 204 engineer two initializes the application on local work area two (on a second client machine) and downloads the current version to local work area two.

At 206, engineer one modifies the local version on local area one and attempts to upload the modified file. If at 208 the file is locked, no file modifications or overwrites are allowed on the common work area. If, however a new current version is uploaded, it replaces the previous current version at 210. If the current version on the common work area is replaced, a notification is sent to other engineers, including engineer two, having the conflict manager running on their local work area. At 212, if engineer two locally modifies and saves his copy of the drawing it is in conflict with the common work area and the conflict manager notifies engineer two of the conflict. Thereafter, at 214 engineers one and two may discuss and resolve the conflict. If it is agreed that the modifications made by engineer one should remain, then engineer two may simply download the current version and overwrite the modifications made in local work area two. Engineer two may also download a prior version of the drawing at 216. Thereafter, engineer two may elect to rollback the drawing on the common work area to the prior version.

As discussed above, the conflict manager provides status indicators for each file under management. These status indicators provide to a user an important indication of whether their local files are up-to-date and also provides an indication of which files have been modified by other users.

A status indicator of "Current" indicates to a user that the file residing locally on the client computer is identical to the version residing in the common work area on the server. A status indicator of "ServerModified" indicates to a user that since downloading a CAD file from the common work area, another user has uploaded or rolled back that file to a different version. Thus, the server version of the file has been modified. A ServerModified status indicator may prompt a user to review/examine the differences between the local and common work area files. It may also prompt a user to synchronize/download the current version on the common work area to be sure local modifications are made to the most up-to-date version.

A status indicator of "ClientModified" indicates that the local copy of a CAD file has been modified, while the CAD file residing in the common work area remains the same as that which was originally downloaded by the user.

A status indicator of "Conflict" indicates that the local copy of a CAD file has been modified from when it was originally downloaded. In addition, another user has uploaded a newer version of that file to the common work area. Conflict indication is important because of the potential for lost work. Specifically, if user 1 uploads a newer CAD version, causing a conflict with the locally modified CAD file on user 2's client computer. If user 2 thereafter uploads his version of the file, the changes made by user 1 will be nullified. Likewise, if user 2 thereafter downloads the current version from the common work area, the local modifications will be deleted. Thus, the Conflict indicator serves an important coordination role to alert various users to situations wherein data and time loses may occur.

Figure 3:
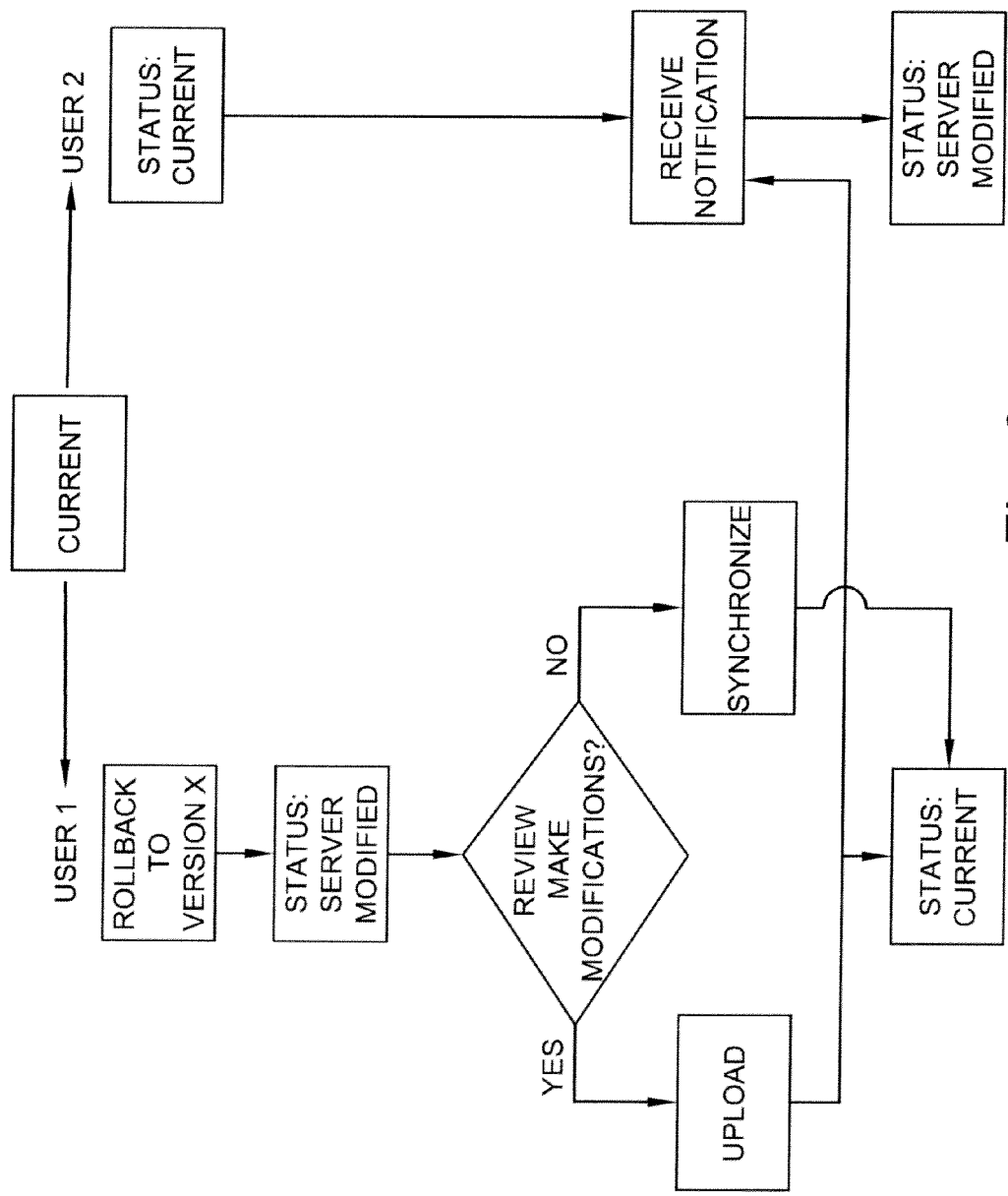
FIG. 3 is an second exemplary scenario of two engineers using the conflict manager.

With reference now to FIG. 3, an exemplary user scenario is presented. In the example of FIG. 3, two users, user 1 and user 2 concurrently open the same CAD file. User 2 works on the current version. However, user 1 elects to work on a previous (historical) version and thus downloads a previous version from the common work area to the local work area. Thereafter, user 1 may work locally on the previous version of the CAD file. Because the local file version differs from the server version in the common work area, the conflict manager indicates that the status of the local copy is ServerModified. Conversely, because user 2 is working from the current version of the file on the server common work area, the indicated status of the local copy is Current. In this manner, a user can easily tell if the version they are locally viewing is the current or an older or out-of-date version of the file.

If user 1 determines that the current version on the common work area should be rolled back to the previous version, user 1 can simply roll back to a previous version. Thereafter, the conflict manager operates as discussed above. If the files are uploaded, the status of the user 1 local copy is no longer ServerModified and is changed to Current. If the current version is rolled back by user 1, user 2 receives notification according to the process shown in FIG. 1. Further, the status of the user 2 local copy is no longer Current, but is now ServerModified because it was modified since last downloaded.

If user 1 determines that the current version on the common work area should not be rolled back to a previous version, user 1 may simply download/synchronize the current version so that the local copy is the current version. After downloading, the status of the user 1 local copy is no longer ServerModified and is changed to Current. If no change is made to the current version on the common work area, then no notification or status change is ever indicated to user 2.

Figure 4:
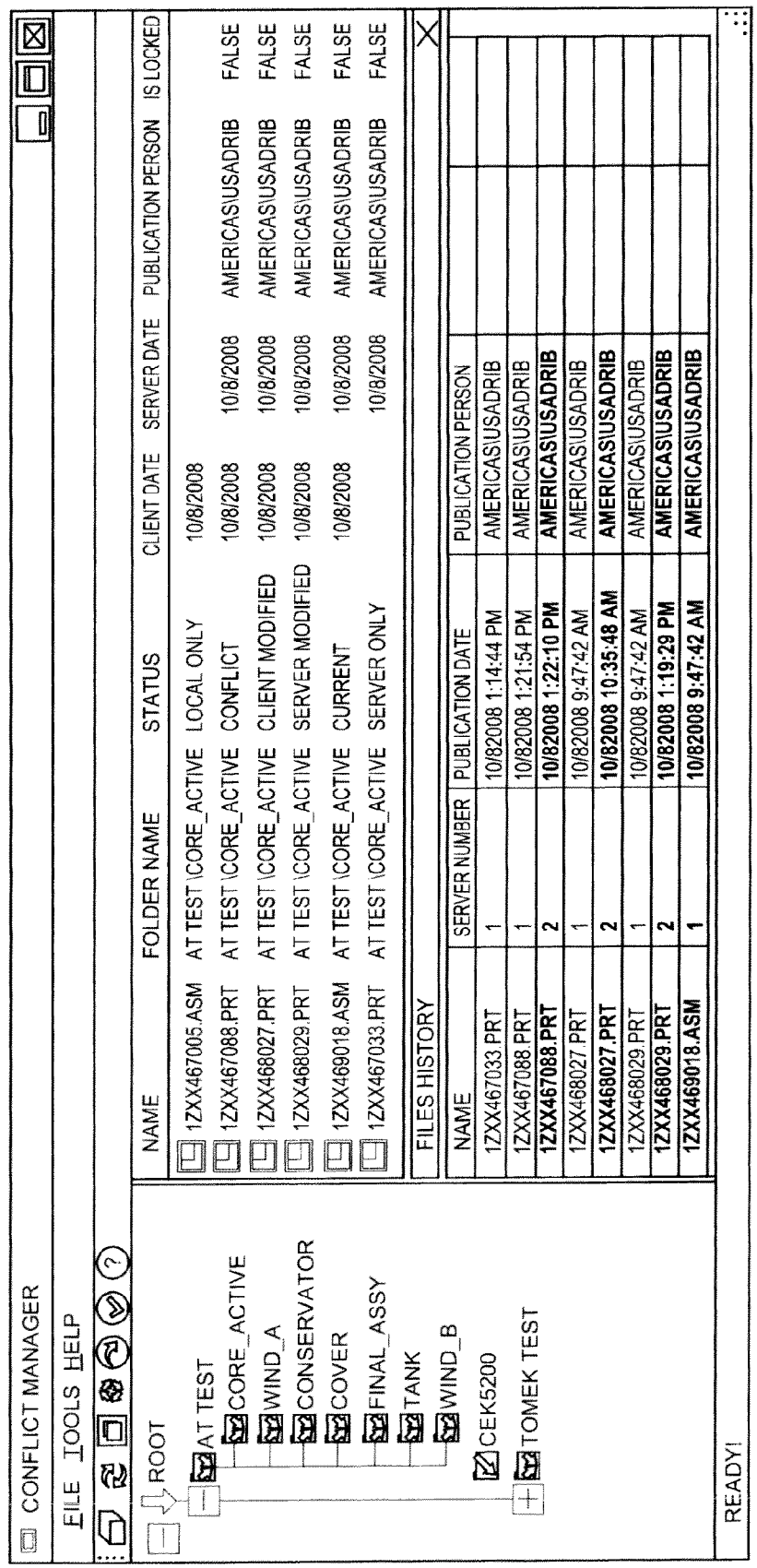
FIG. 4 is screen view of the conflict manager showing the plurality of previous versions maintained in the common work area.

With reference now to FIG. 4, as can be seen, the visualized file folders may include symbols that represent different treatment by the conflict manager. For example, projects may be created in accordance with folders that behave like Windows TM folders, holding sub-folders and files that contain CAD, team member, administrative and date/time information. Within the conflict manager user interface folders may include different visual indicia of the type of folder and files contained therein. For example, a folder may include colored arrows wherein a folder with a red arrow includes information of a type that is not managed by the conflict manager. A folder with just a green arrow has CAD files, however the file is not set as a managed folder and thus the files within the folder reside only in the users local computer. A folder with both a red and a green arrows is a folder wherein the files therein are managed by the conflict manager. Projects may be organized in any manner by a user including, for example, assembly modules, phases, project name or number and/or geographical locations.

The conflict manager user interface may also include a version box that may be opened and displays the version history of the files within a folder. For example, in the version box it can be seen that two versions of file name 1zxx467088.prt exist. A first version was published (i.e. uploaded to the common work area) at 1:21 pm on Oct. 8, 2008. A second version was published (and became the current version) at 1:22 pm on Oct. 8, 2008. In this manner a user may easily review prior versions and, if desired, open and work from the prior versions.

With reference now to FIG. 5A-F, exemplary screen shots are shown of a conflict manager user interface according to the present invention. FIGS. 5A-F are split screen images, wherein the top half shows a conflict manager user interface for a first user and the bottom half shows a conflict manager user interface for a second user. The first and second users are working at different client machines and thus have separate and unique local work areas. The first and second users may be in the same building or may be in different geographic locations. It should further be appreciated that, though the following discussion is limited to two users for sake of clarity, the conflict manager of the present invention supports any number simultaneous users.

Figure 5A:
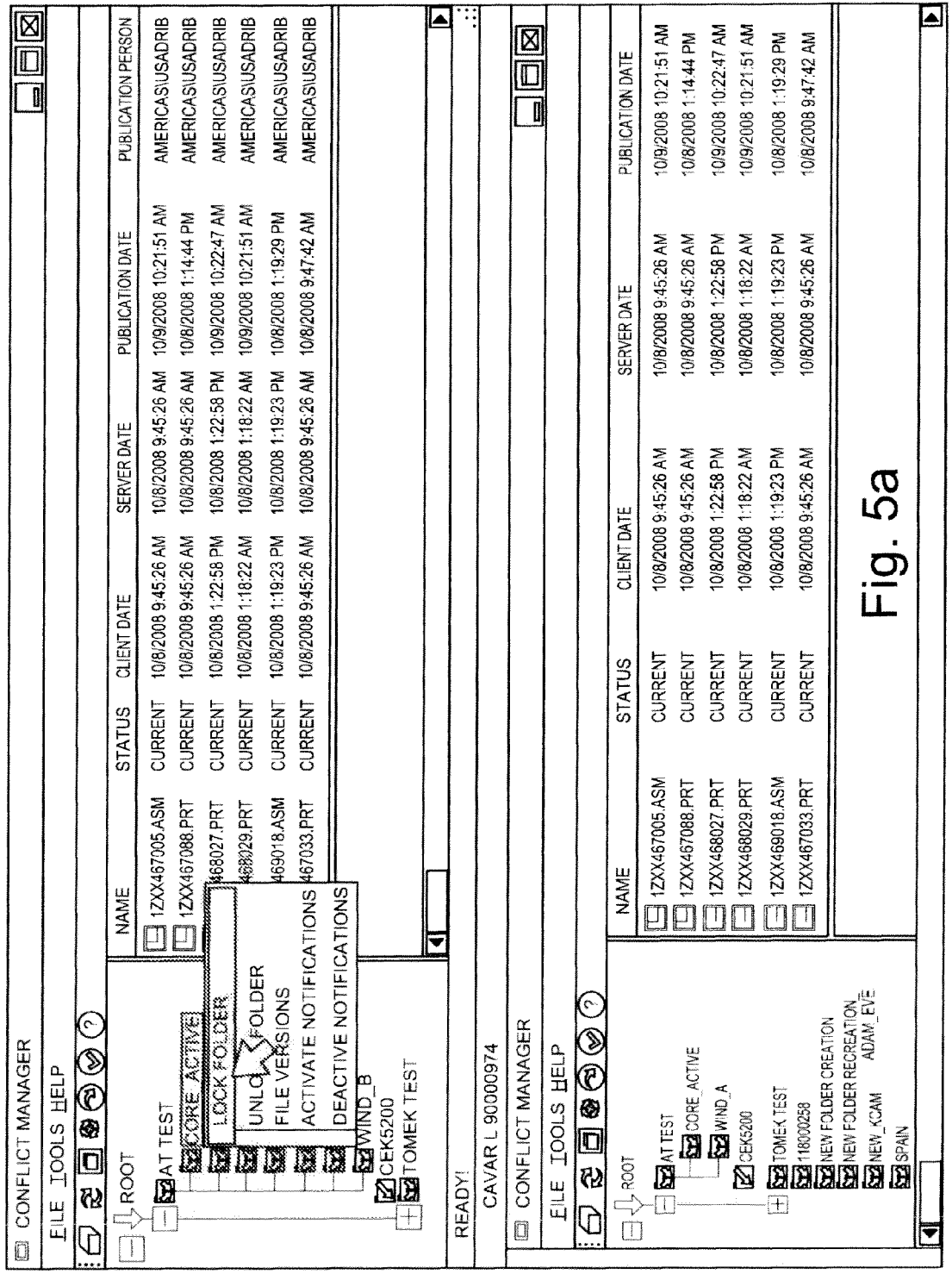
FIG. 5A is a split-screen view of the conflict manager showing the notification functionality of the conflict manager.

According to one embodiment of the present invention the notification function of the conflict manager is shown beginning at FIG. 5A. As can be seen user 1, upon right clicking a file, is presented with several options. User 1 may lock the file, whereupon no other users may modify the current versions of any of the CAD files within the file folder. Conversely, if the user previously locked a folder, the folder may be unlocked. A user may view file versions for all files within the folder. Selecting this option will open the versions box wherein all current and historical file versions are shown. Finally, the user may activate or deactivate notifications for the selected folder.

Figure 5B:
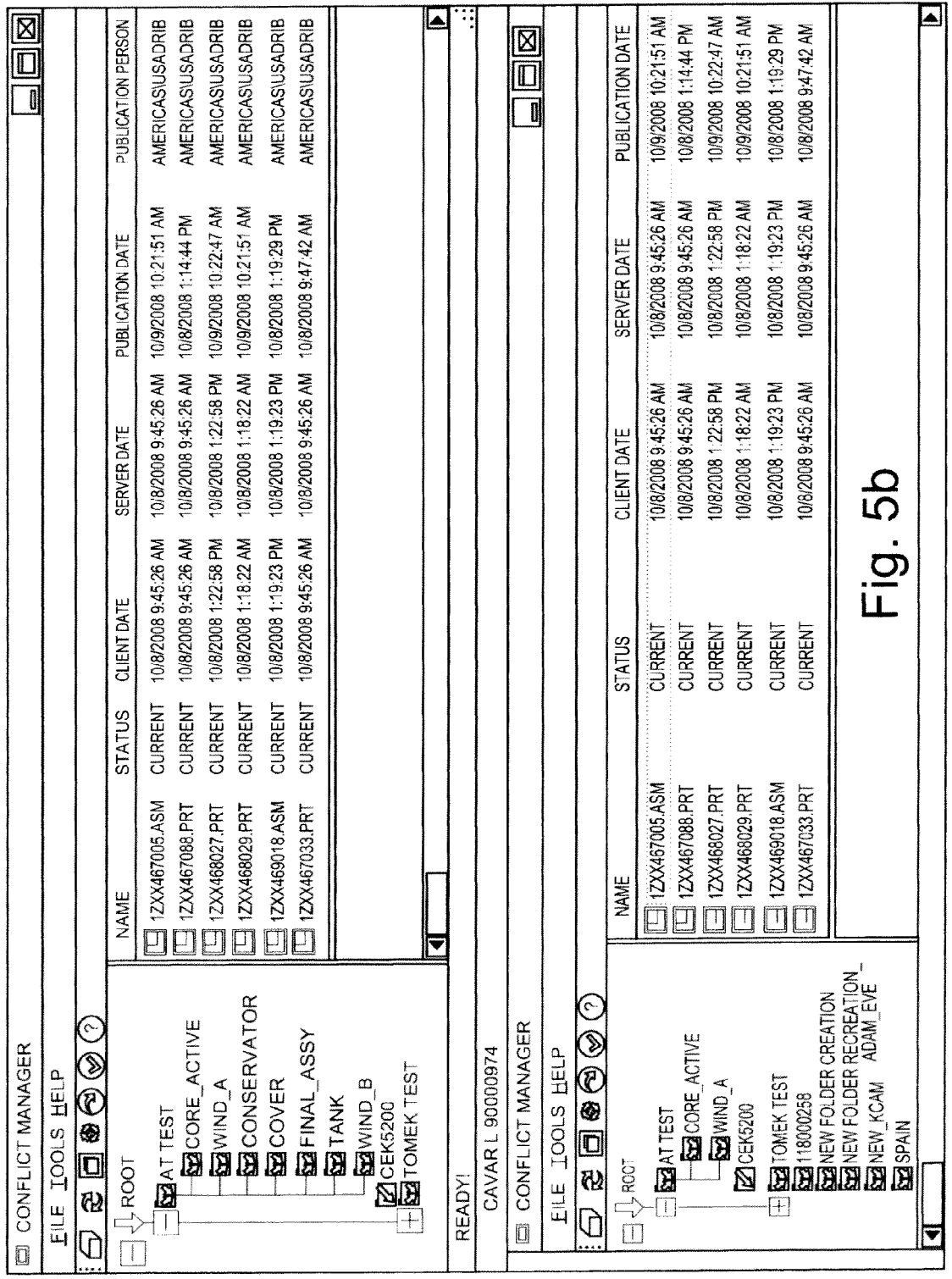
FIG. 5B is a split-screen view of the conflict manager showing the notification functionality of the conflict manager.

With reference to FIG. 5B, if user 1 opens file 1zxx467005.asm and makes modifications to the local version, the status of the file within the conflict manager will change from Current (i.e. synchronized with the version in the common work area) to ClientModified. This indicates that the client version (i.e. local version) is different than the version residing in the common work area, and further, that the modifications were made locally on the client machine. Because the changes made by user 1 are only local (no attempts to upload have been made), the file version in the common work area does not change, and thus, the version on user 2's local work area is still Current.

Figure 5C:
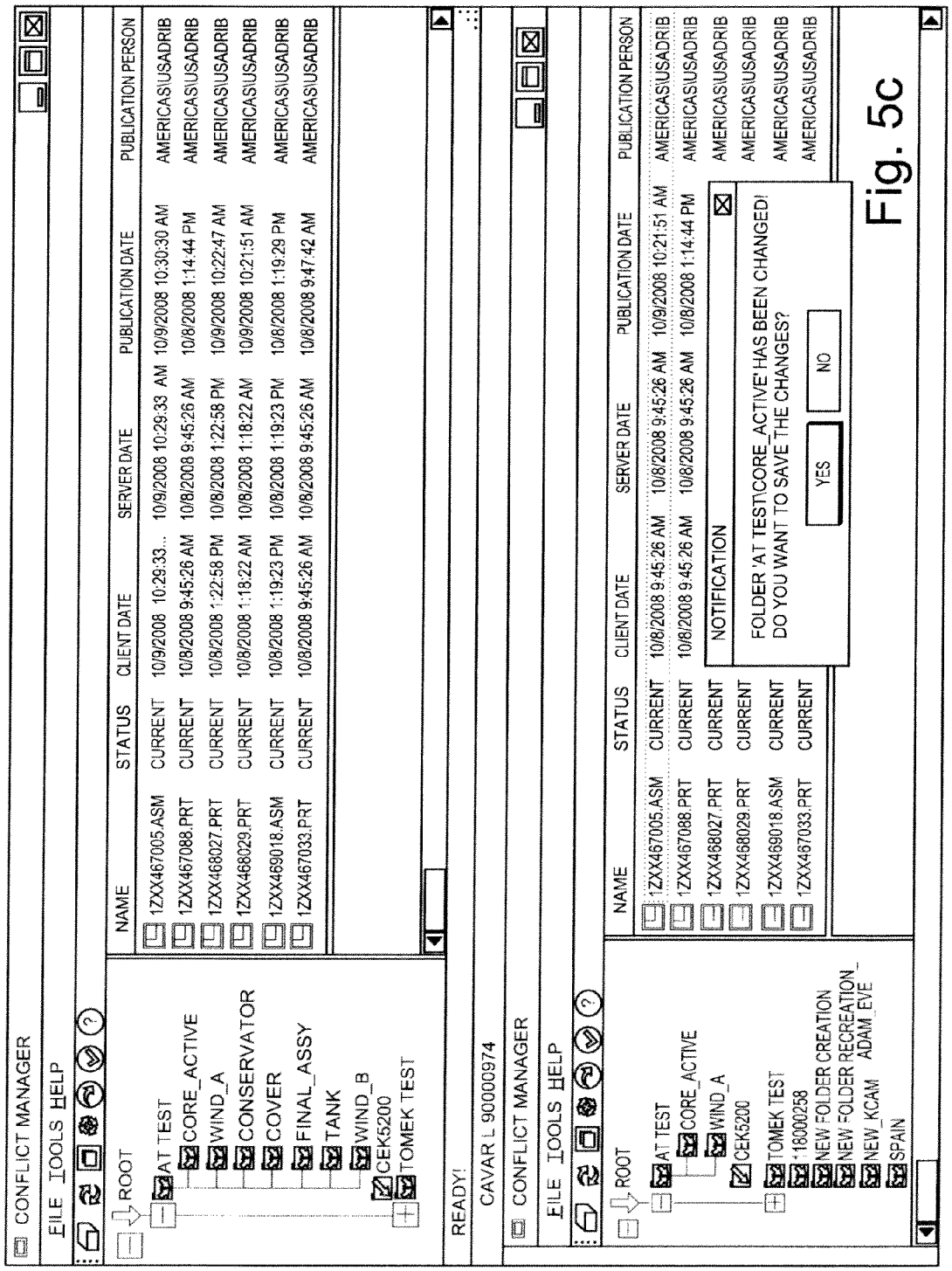
FIG. 5C is a split-screen view of the conflict manager showing the notification functionality of the conflict manager.

With reference to FIG. 5C, if user 1 uploads the local version to the common work area by selecting the synchronization button, the local work area version is now Current because it is identical to the current version on the common work area. When the current version in the common work area is changed, a notification is sent to any user with active notifications. As can be seen, user 2 receives a notification indicating that a file in folder "AT Test\core_active" has been changed and presents user 2 with the option to review the changes.

Figure 5D:
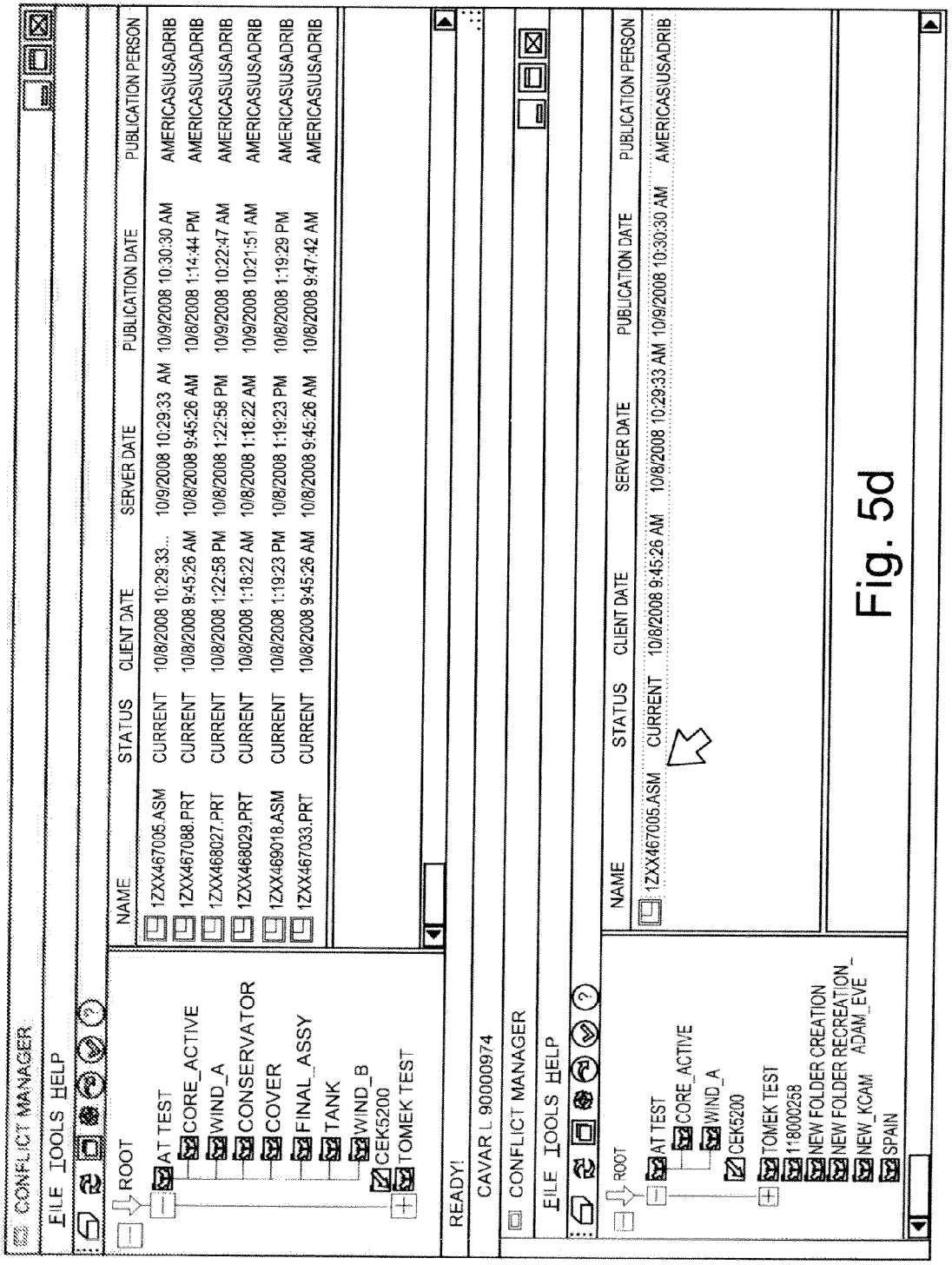
FIG. 5D is a split-screen view of the conflict manager showing the notification functionality of the conflict manager.
Figure 5E:
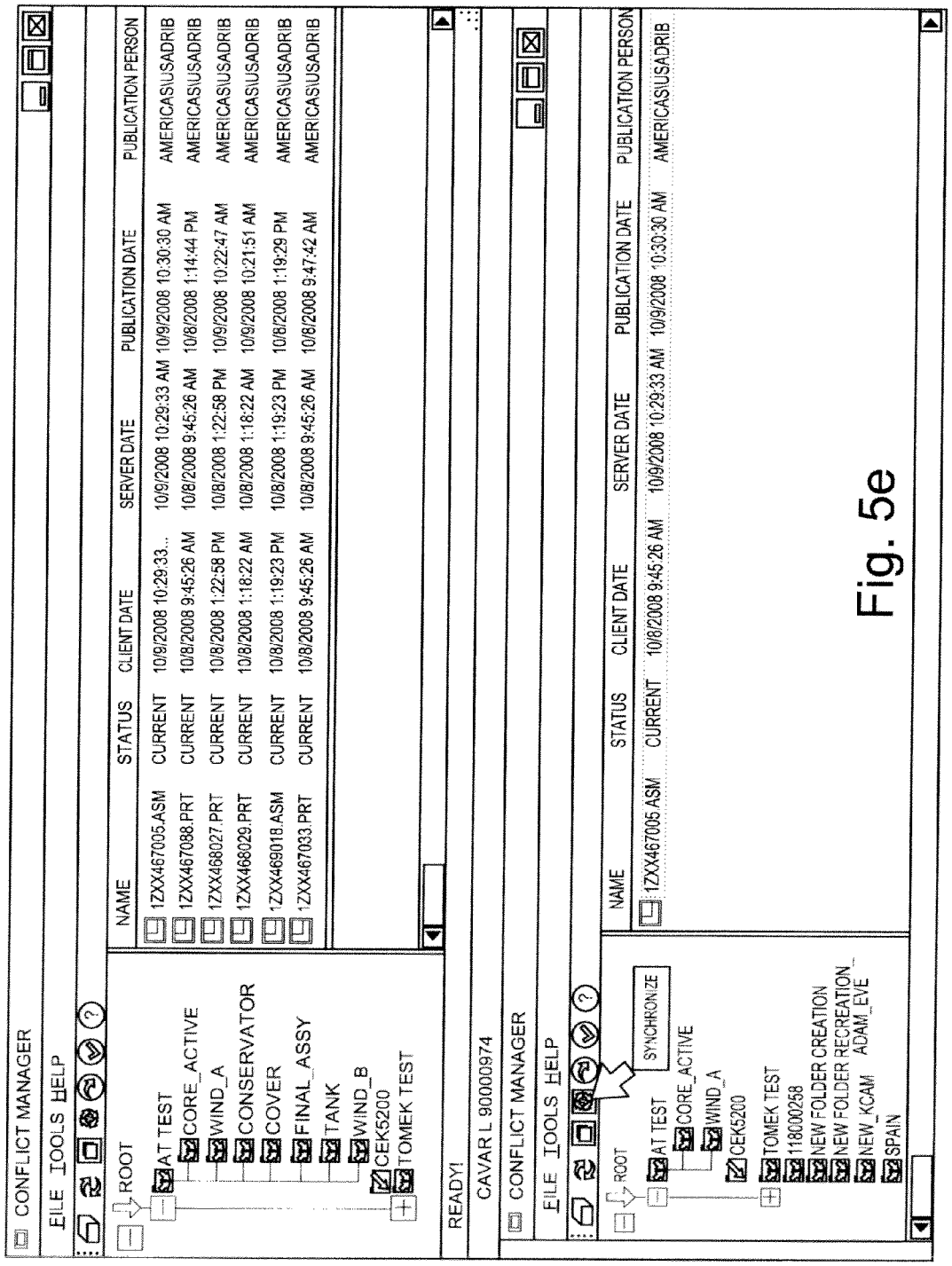
FIG. 5E is a split-screen view of the conflict manager showing the notification functionality of the conflict manager.
Figure 5F:
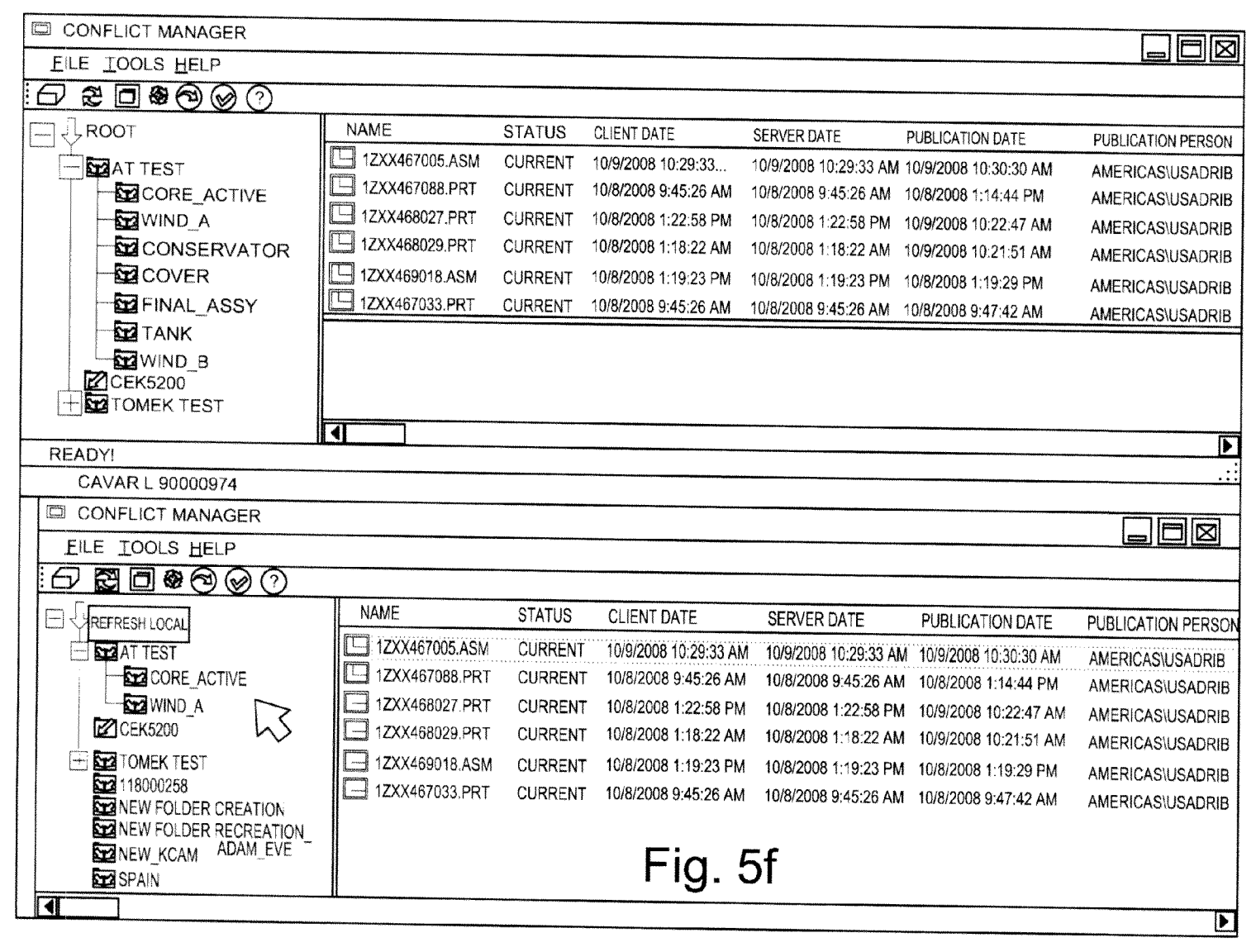

With reference to FIG. 5D, if user 2 opts to review the changes, the conflict manager displays the file that was modified. As can be seen, the status of the file is now ServerModified, indicating that the server version (i.e. common work area version) is different than the version residing in the local work area, and further that the modifications were not made locally, but on the server. User 2 may then select the file and view using the appropriate CAD software. If further inquiry is necessary, user 2 may contact user 1 via email, instant message or telephone to discuss the changes user 1 made to the drawing. If user 2 is satisfied with the changes, the local version of the file may be synchronized with the server version (in the common work area) by selecting the synchronize button (see FIG. 5E). This will cause the conflict manager to download the current version from the server to the user 2 client machine. With reference now to FIG. 5F, after synchronization, the status of file 1zxx467005.asm on user 2's conflict manager indicates the file is current and therefore identical to the version residing on the server.

Figure 6A:
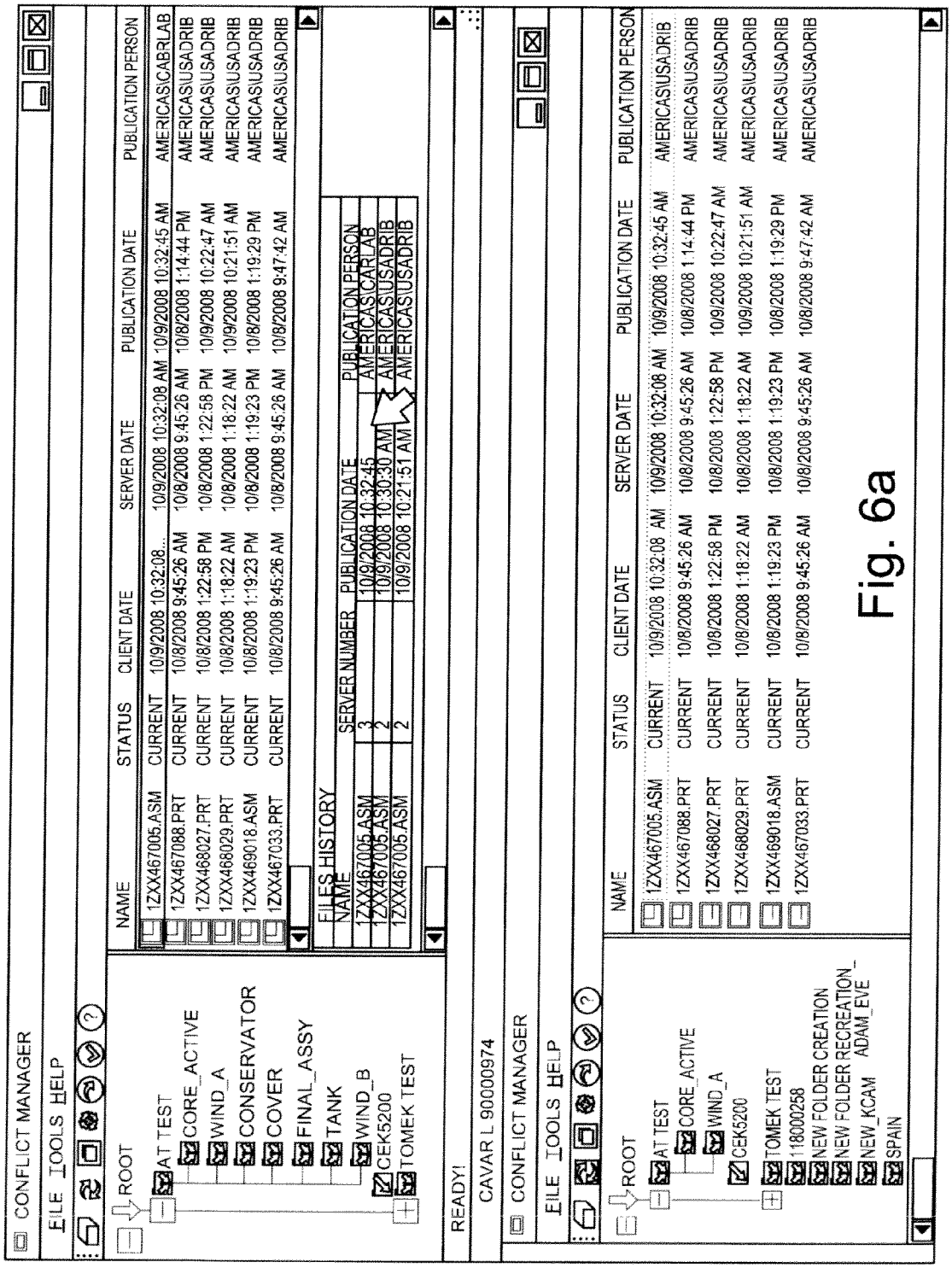
FIG. 6A is a split-screen view of the conflict manager showing the versioning functionality of the conflict manager.
Figure 6B:
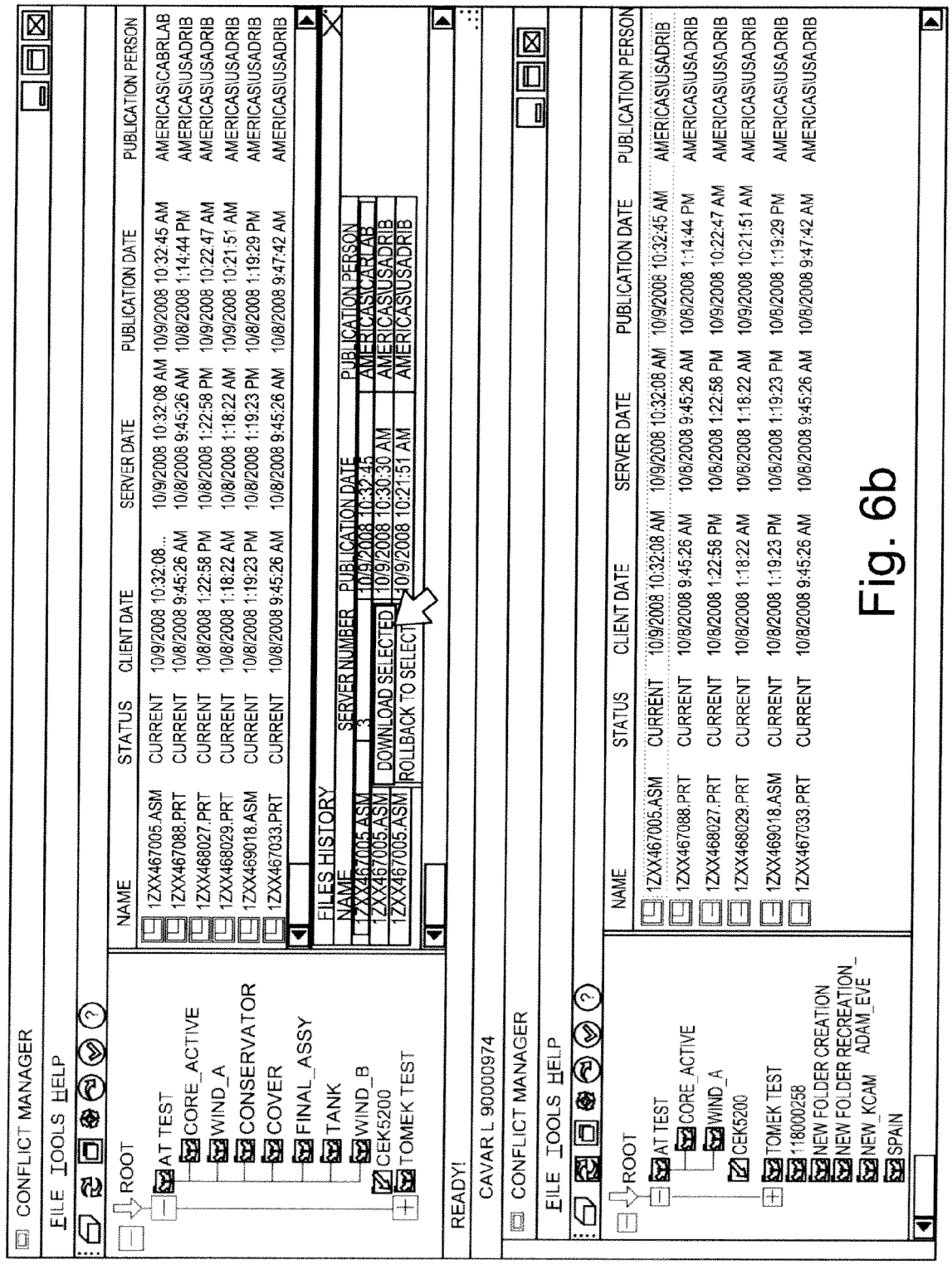
FIG. 6B is a split-screen view of the conflict manager showing the versioning functionality of the conflict manager.

According to one embodiment of the present invention the versioning function of the conflict manager is shown beginning at FIG. 6A. As discussed above, a user may select a folder and choose to view the file versions for the folder. Likewise, as shown in FIG. 6A a user may choose to view the file versions for a specific selected file (1zxx467005.asm in the present example). As can be seen, three versions exist for that file, listed in chronologic order. Version 3 is the most recent and is therefore the current version. As shown in FIG. 6B, if user 1 wishes to transfer an earlier version to the client machine (local work area), the user may simply right click that version and choose "Download selected." As can be seen, the user may also rollback the current version on the server to a previous version.

Figure 6C:
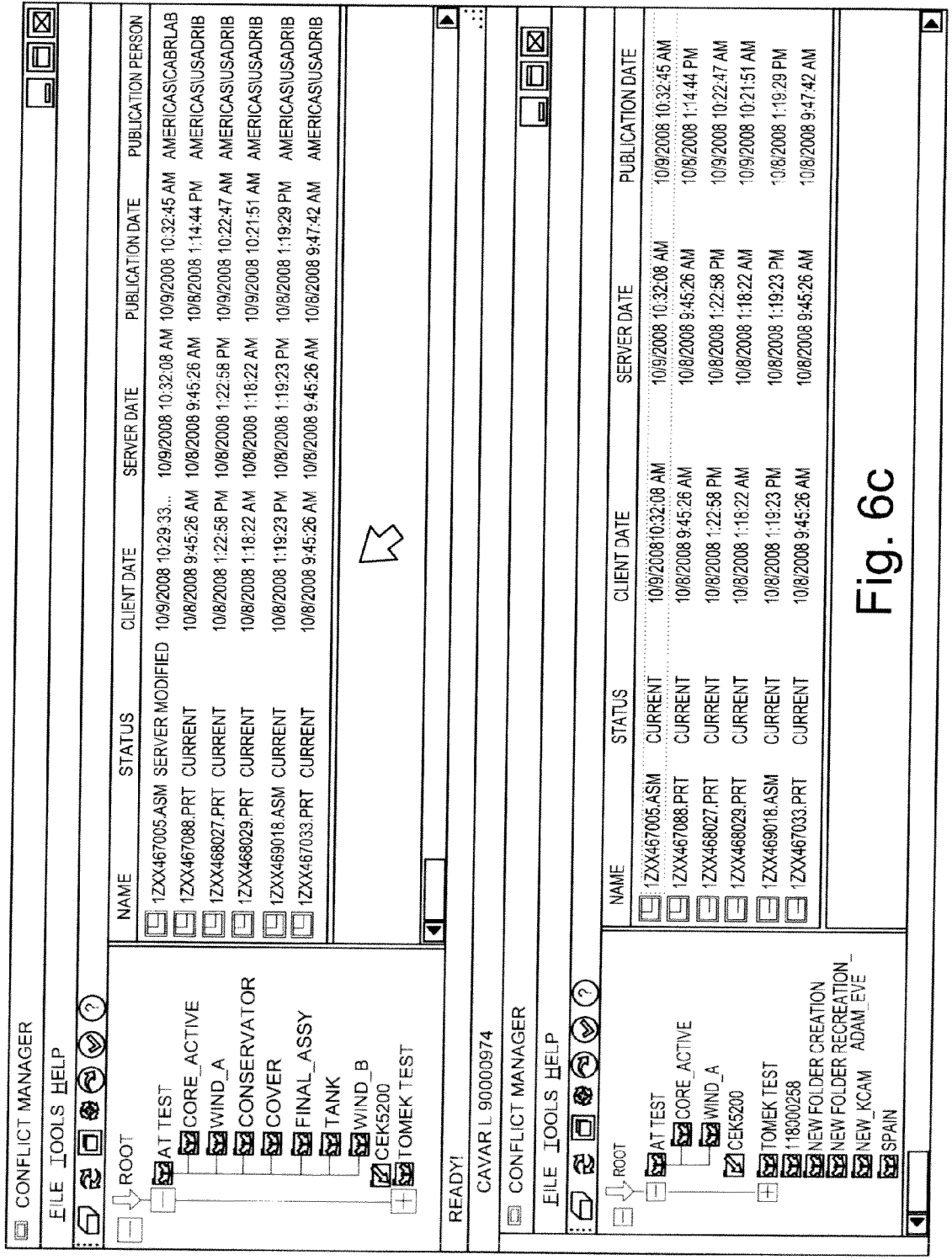
FIG. 6C is a split-screen view of the conflict manager showing the versioning functionality of the conflict manager.

With reference to FIG. 6C, if user 1 selects "Download selected," the selected version is downloaded from the server to the local client. Because the local version is now different from the server version, the status indicates that the file is "ServerModified." User 1 may thereafter review or work from the local version using the appropriate CAD software.

Figure 7A:
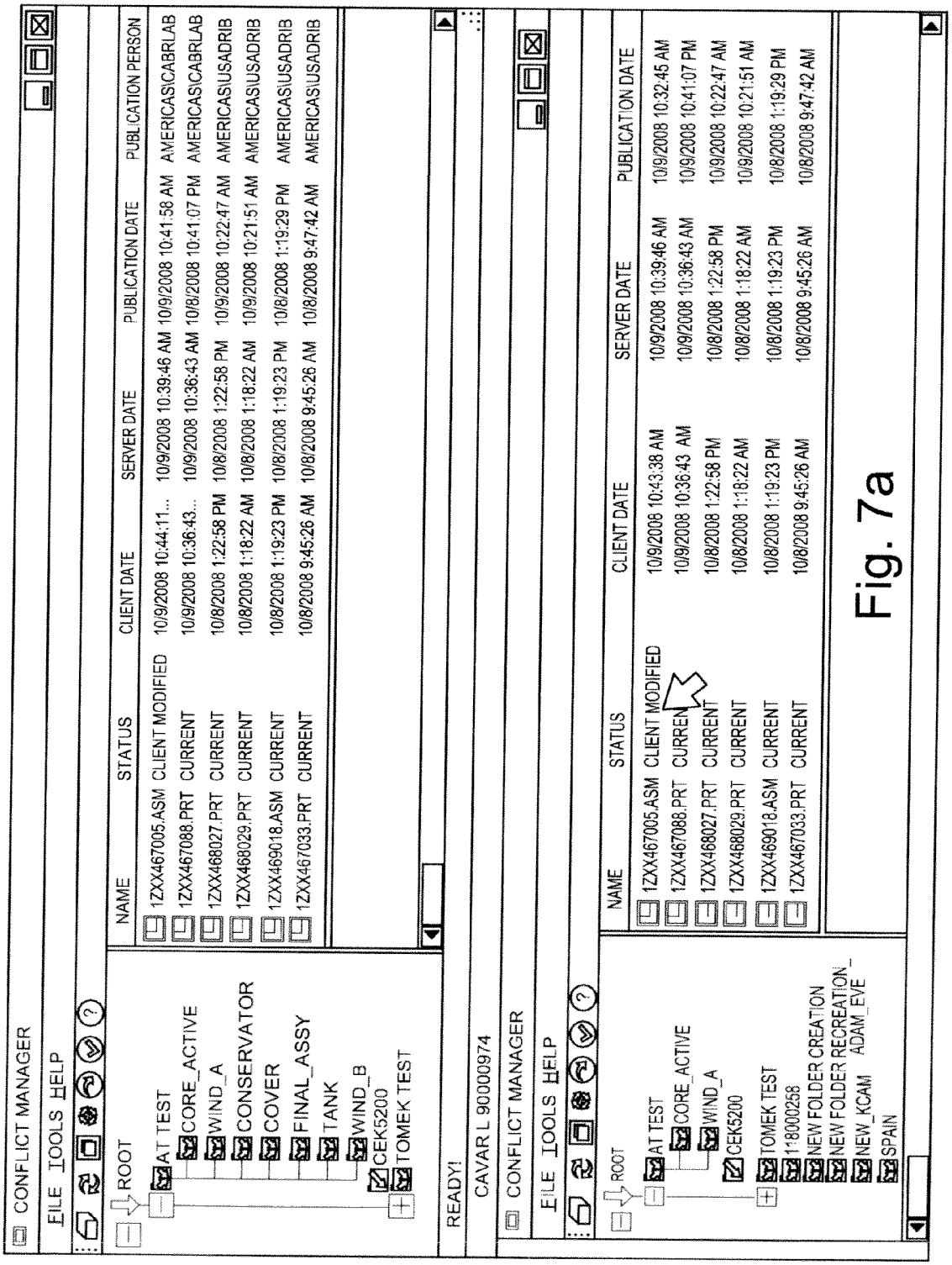
FIG. 7A is a split-screen view of the conflict manager showing the conflict management functionality of the conflict manager.
Figure 7B:
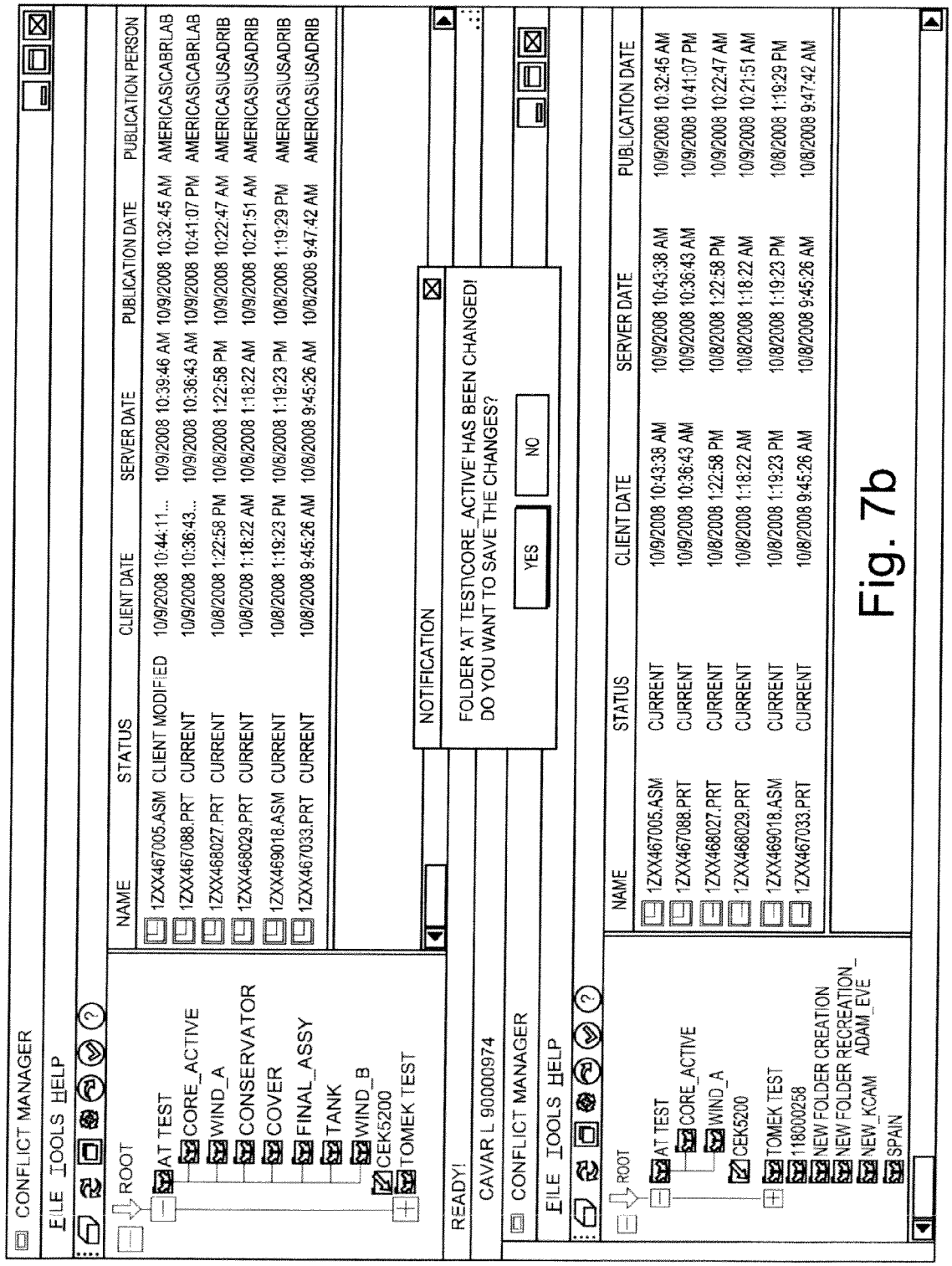
FIG. 7B is a split-screen view of the conflict manager showing the conflict management functionality of the conflict manager.
Figure 7C:
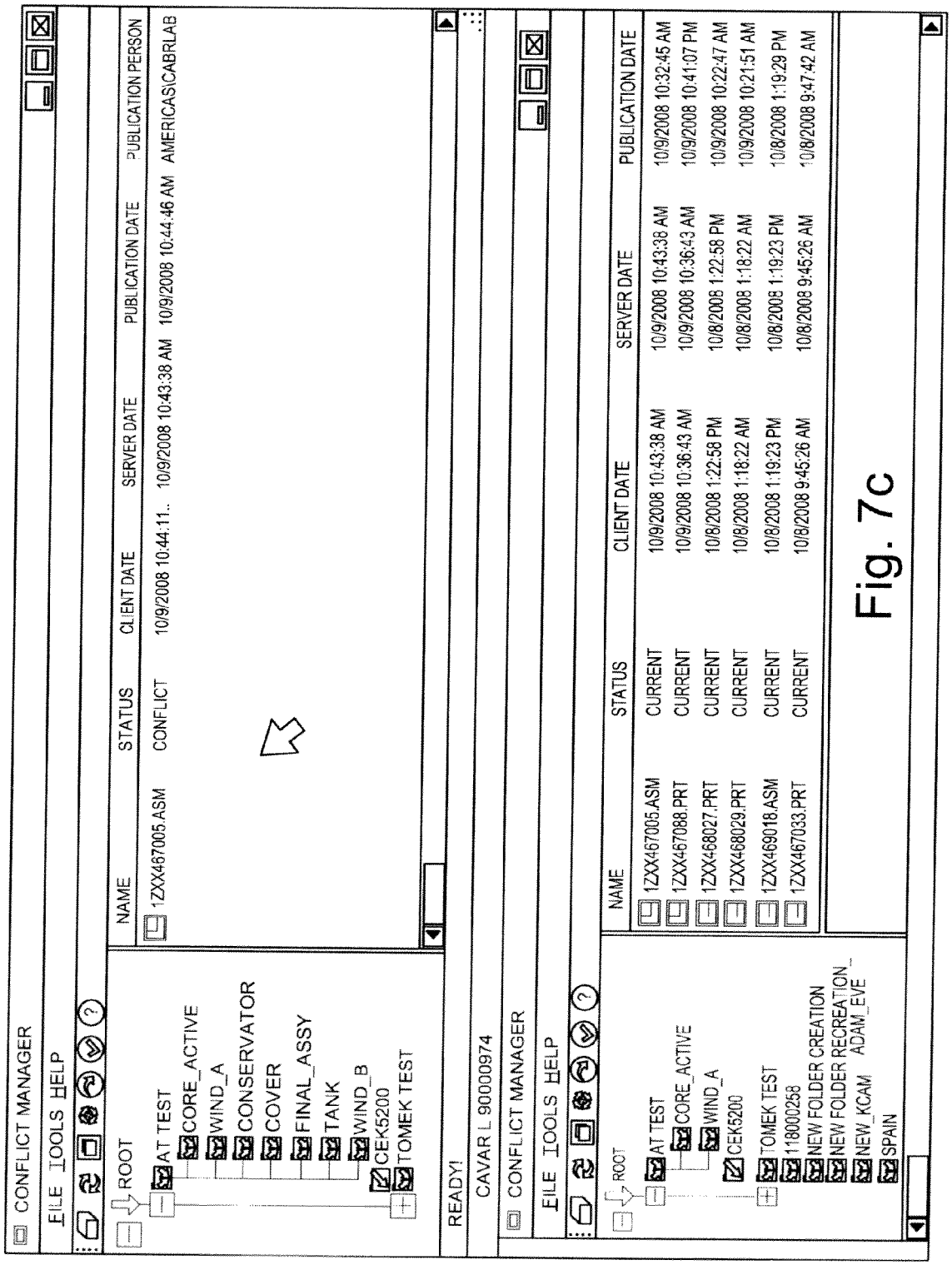
FIG. 7C is a split-screen view of the conflict manager showing the conflict management functionality of the conflict manager.

According to one embodiment of the present invention, the conflict management functionality of the conflict manager is shown beginning at FIG. 7A. As can be seen, both user 1 and user 2 have concurrently modified their respective local versions of file 1zxx467005.asm as indicated by the status ClientModified. If, as shown in FIG. 7B, user 2 uploads the local version to the server, the status of 1zxx467005.asm on user 2's client machine is now Current because both the server and local client version are identical. Concurrently, user 1 receives a notification indicating that the file has been changed and providing the option to review the changed file. With reference to FIG. 7C, if the user opts to review the changes the file is displayed and the status indicates a "Conflict." Thus, conflict status occurs when two users have made local, client side modifications to the same file, and one of the users then uploads the local file to the server/common work area. Thereafter, the status of the file for the uploading user will indicate "Current" and the status for the other user will indicate "Conflict."

Figure 7D:
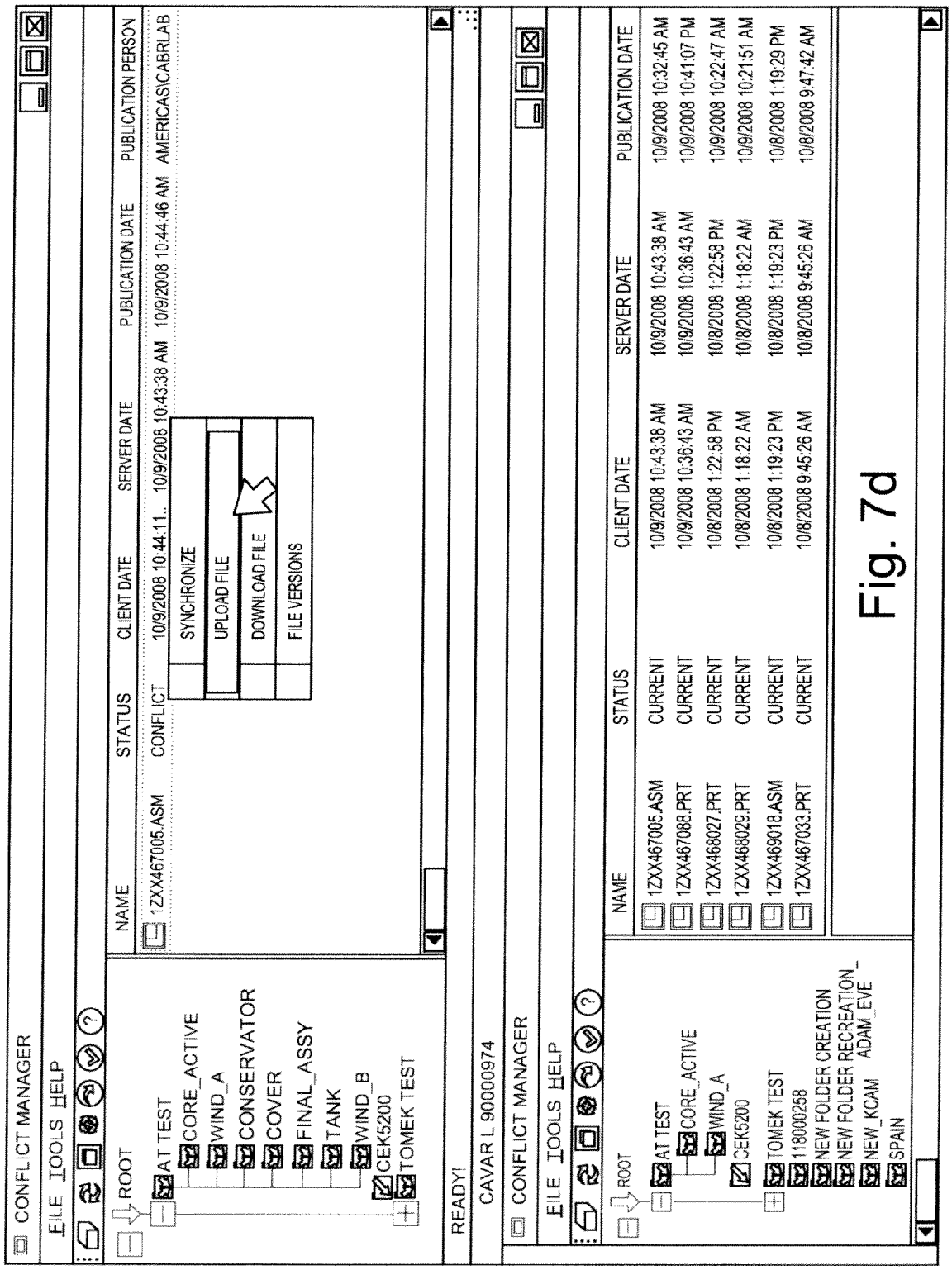
FIG. 7D is a split-screen view of the conflict manager showing the conflict management functionality of the conflict manager.

When a conflict is recognized, user 1 may communicate with user 2 in person or via, email, instant message or telephone. With reference to FIG. 7D, in a conflict situation, two solutions are available to the users. User 1 may download the current version on the common work area by selecting the "Download File" option. By so doing, User 1 is accepting changes made by User 2 and allowing his own changes to be overwritten. User 1 may upload the local client version to the common work area on the server by selecting the "Upload File" option. By so doing, User 1 is overwriting the changes made by User 2 and substituting them with his own changes. The conflict scenario can alternatively continue if user 1 opens the file version box and rolls back to a previous version, which overwrites both the changes made by User 1 and User 2. It should be appreciated that if User 1 chooses to upload or to roll back to a previous version, User 2 is notified of the change as discussed above.

Figure 8A:
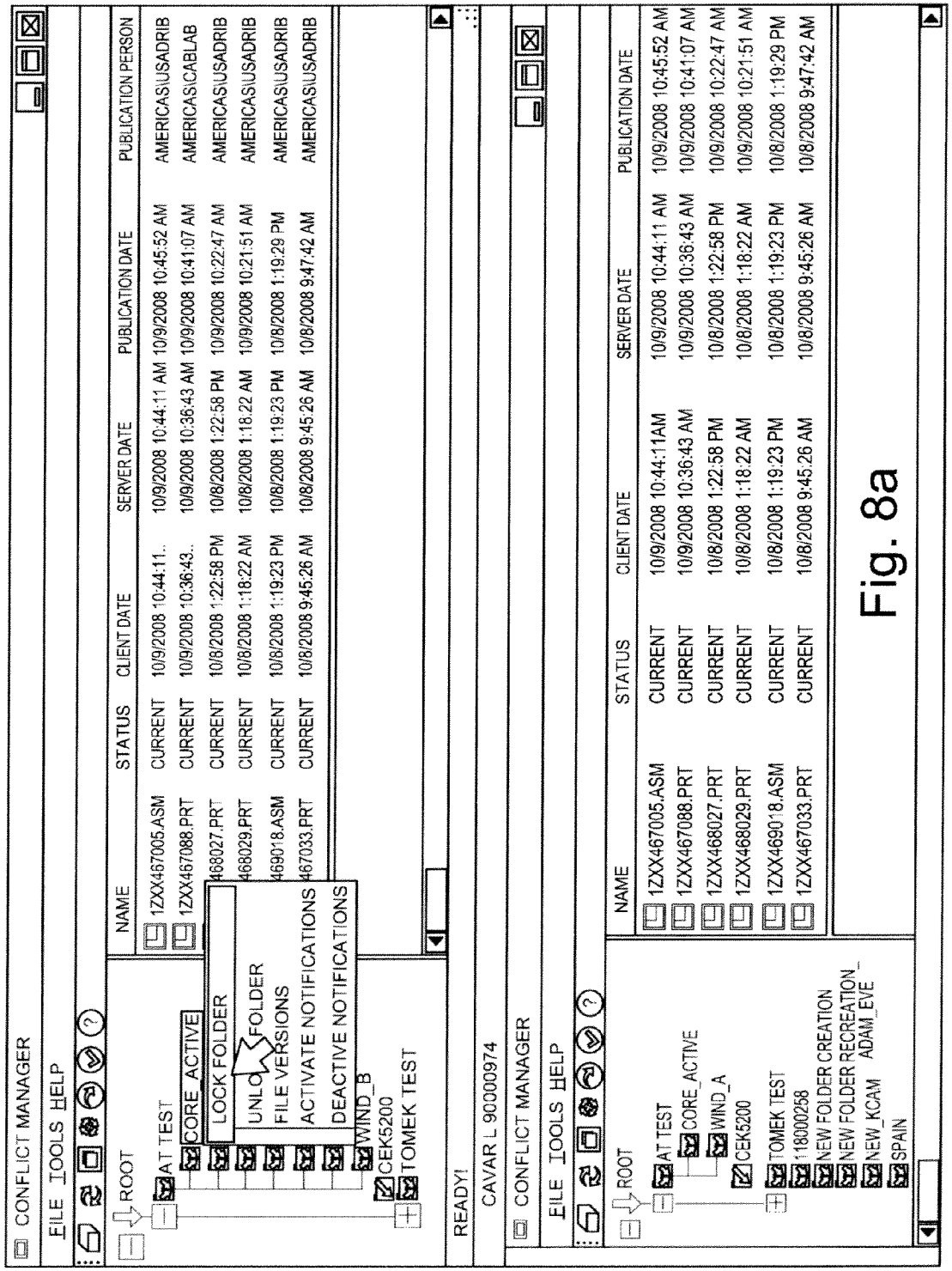
FIG. 8A is a split-screen view of the conflict manager showing the file locking functionality of the conflict manager.
Figure 8B:
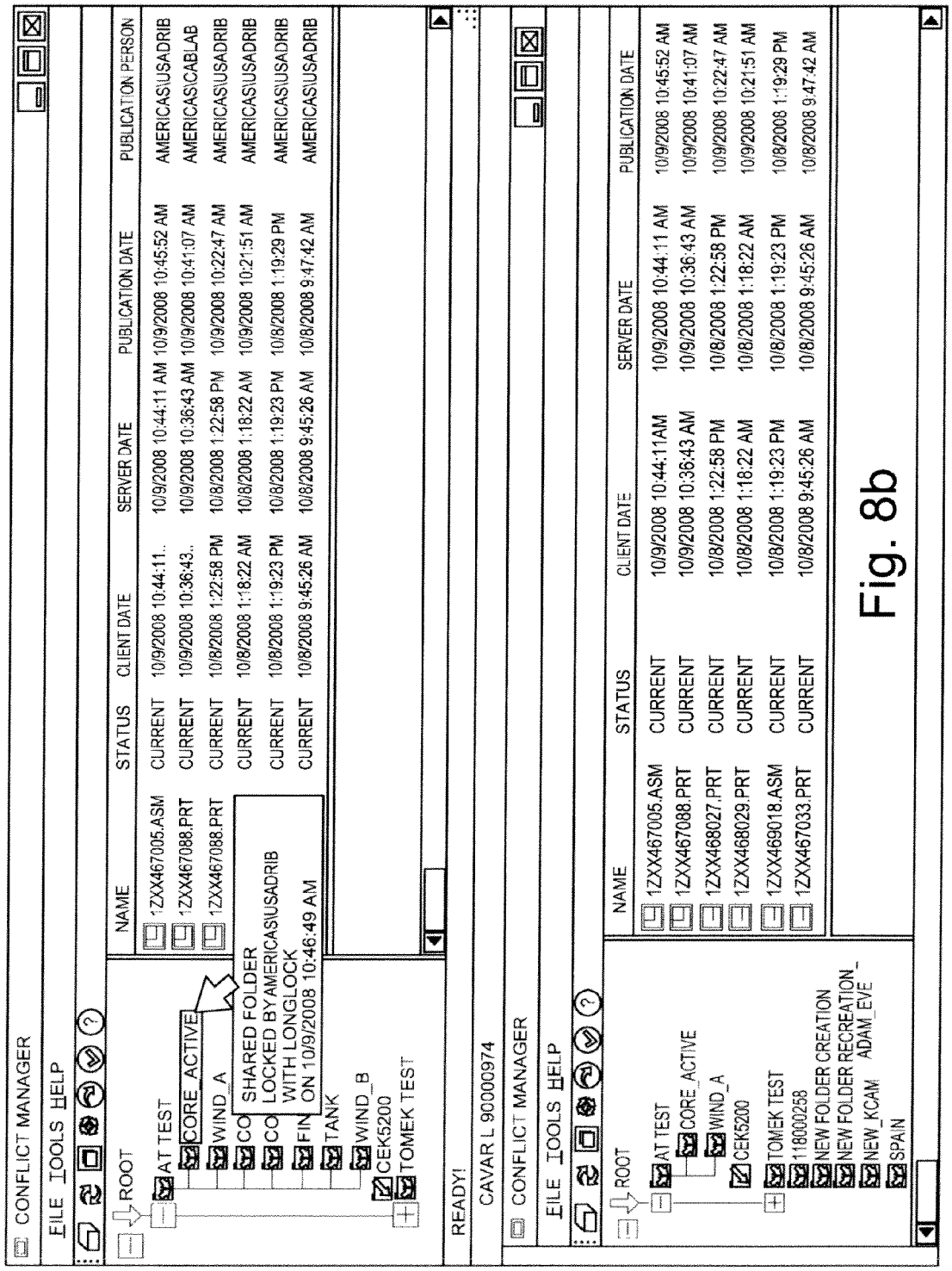
FIG. 8B is a split-screen view of the conflict manager showing the file locking functionality of the conflict manager.
Figure 8C:
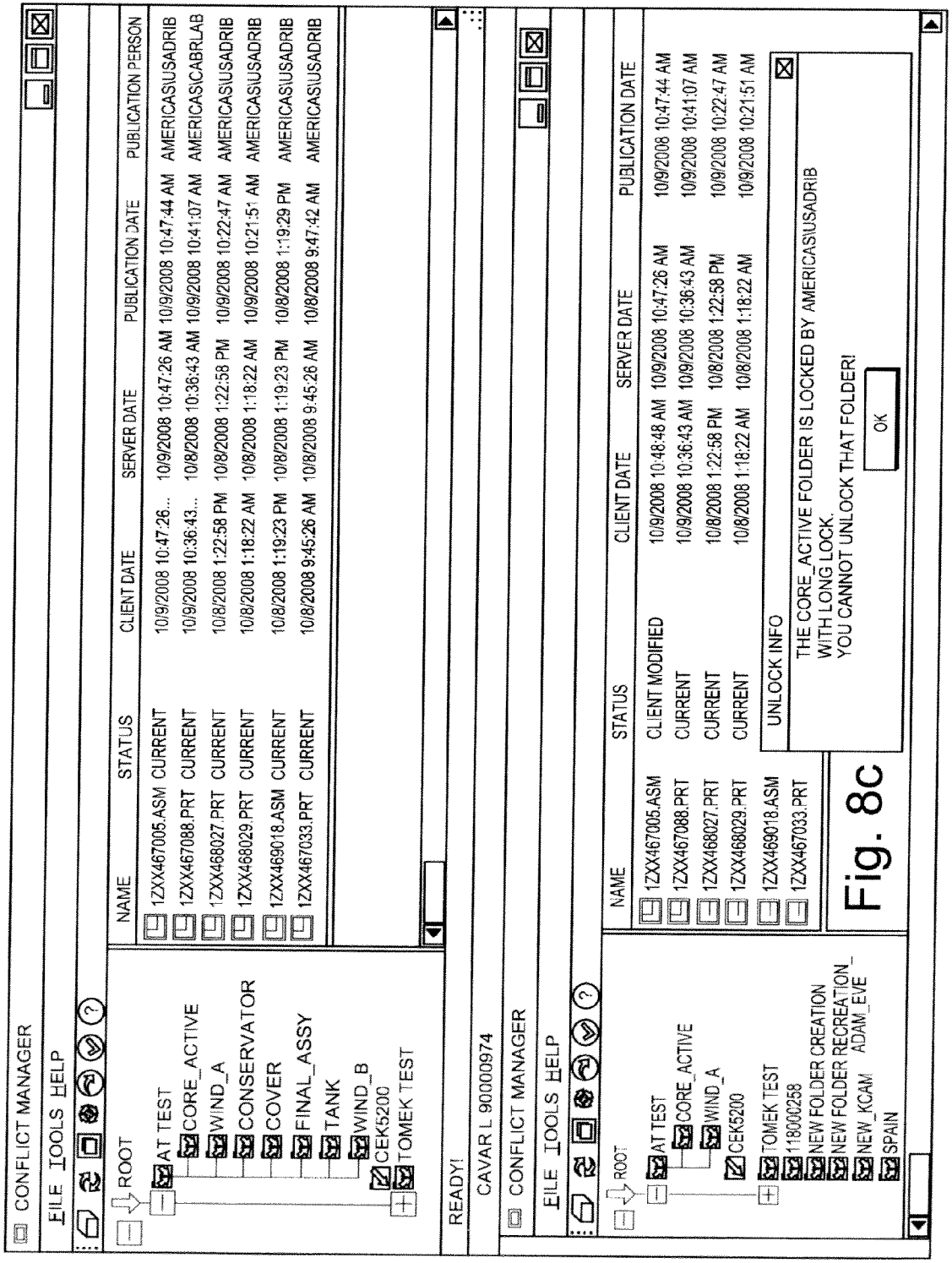
FIG. 8C is a split-screen view of the conflict manager showing the file locking functionality of the conflict manager.

According to one embodiment of the present invention, the locking function of the conflict manager is shown, beginning at FIG. 8A. By right clicking a folder and selecting the "Lock folder" option, User 1 may lock a folder and prevent any other users from modifying any files therein. When a folder is locked, only the locking user may modify the CAD files within the locked folder. Other users can work with 'read-only copies'. With reference to FIG. 8B, locked folders are visually represented as partially translucent or blanked out. If a user clicks on a locked folder, identifying information of the locking user is presented visually. With reference to FIG. 8C, if a user attempts to modify the contents of a locked file, and is not the locking user, a notification box indicates that the folder is locked and who the locking user is.

As can be appreciated by one of ordinary skill in the art, the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a flash drive, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the present invention may be written in an object oriented programming language such as Java, Smalltalk, C++ or the like, or may also be written in conventional procedural programming languages, such as the "C" programming language. The program code may execute entirely in a DMS system, or a separate computer as a stand-alone software package.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of managing collaborative design comprising:
providing a common work area to store a current version of a drawing file therein;
providing a first and a second local work area, each in communication with said common work area and each storing a local version of said drawing file therein;
downloading said current version of said drawing file from said common work area to said first local work area without requiring check-out of said drawing file;
modifying said drawing file current version on said first local work area without requiring checkout of said drawing file current version to create a modified version of said drawing file current version;
uploading said modified version of said drawing file from said first local work area to said common work area to replace said current version of said drawing file, said replaced current version being stored as a previous version on said common work area;
immediately notifying a user of said second local work area of the replacement of said current version of said drawing file;
indicating a file status of the local version stored on said second local work area; and
wherein said file status includes a first status if said local version stored on said second local work area was the same as the current version stored on the common work area just prior to replacing said current version with said modified version, and a second file status if said local version stored on said second local work area was different from the current version stored on the common work area just prior to replacing said current version with said modified version.

2. The method according to claim 1 wherein said step of immediately notifying a user of said second local work area of the replacement of said current version of said drawing file further comprises displaying a pop-up box.

3. The method of claim 2 wherein said pop-up box includes the name and location of the drawing file being changed.

4. The method of claim 2 wherein said pop-up box includes the name and contact information of the user of the first local work area.

5. The method of claim 1 wherein said common work area stores all previous versions of said current version of said drawing file.

6. The method of claim 5 further comprising, restoring one of said previous versions as said current version.

7. A computer program product comprising: a non-transitory computer readable medium having computer readable program code embodied therein to manage concurrent engineering, the non-transitory computer readable medium having: computer readable program code to provide a common work area to store a current version of a drawing file therein; computer readable program code to providing a first and a second local work area, each in communication with said common work area and each storing a local version of said drawing file therein; computer readable program code to download said drawing file current version from a common work area without requiring check-out of said drawing file; computer readable program code to modify said drawing file current version without requiring check-out of said drawing file to create a modified version of said drawing file; computer readable program code to upload said drawing file modified version from said first local work area to said common work area to replace said current version of said drawing file and store said replaced current version as a previous version on said common work area; computer readable program code to immediately notify a user of said second local work area of the replacement of said current version of said drawing file; computer readable program code to indicate a file status of the local version stored on said second local work area; and wherein said file status includes a first status if said local version stored on said second local work area was the same as the current version stored on the common work area just prior to replacing said current version with a modified version, and a second file status if said local version stored on said second local work area was different from the current version stored on the common work area just prior to replacing said current version with a modified version.

8. The computer program product of claim 7, wherein said computer readable program code to immediately notify a user of said second local work area of the replacement of said current version of said drawing file further comprises computer readable program code to display a pop-up box.

9. The computer program product of claim 8 wherein said pop-up box includes the name and location of the drawing file being changed.

10. The computer program product of claim 8 wherein said pop-up box includes the name and contact information of the user of the first local work area.

11. The computer program product of claim 8 wherein said common work area stores all previous versions of said current version of said drawing file.

12. The computer program product of claim 7, wherein said computer readable program code further comprises, computer readable program code to restore one of said previous versions as said current version.

13. The computer program product of claim 7 wherein said current version of said drawing file is available for concurrent modification by users.

\* \* \* \* \*